Figure 3:
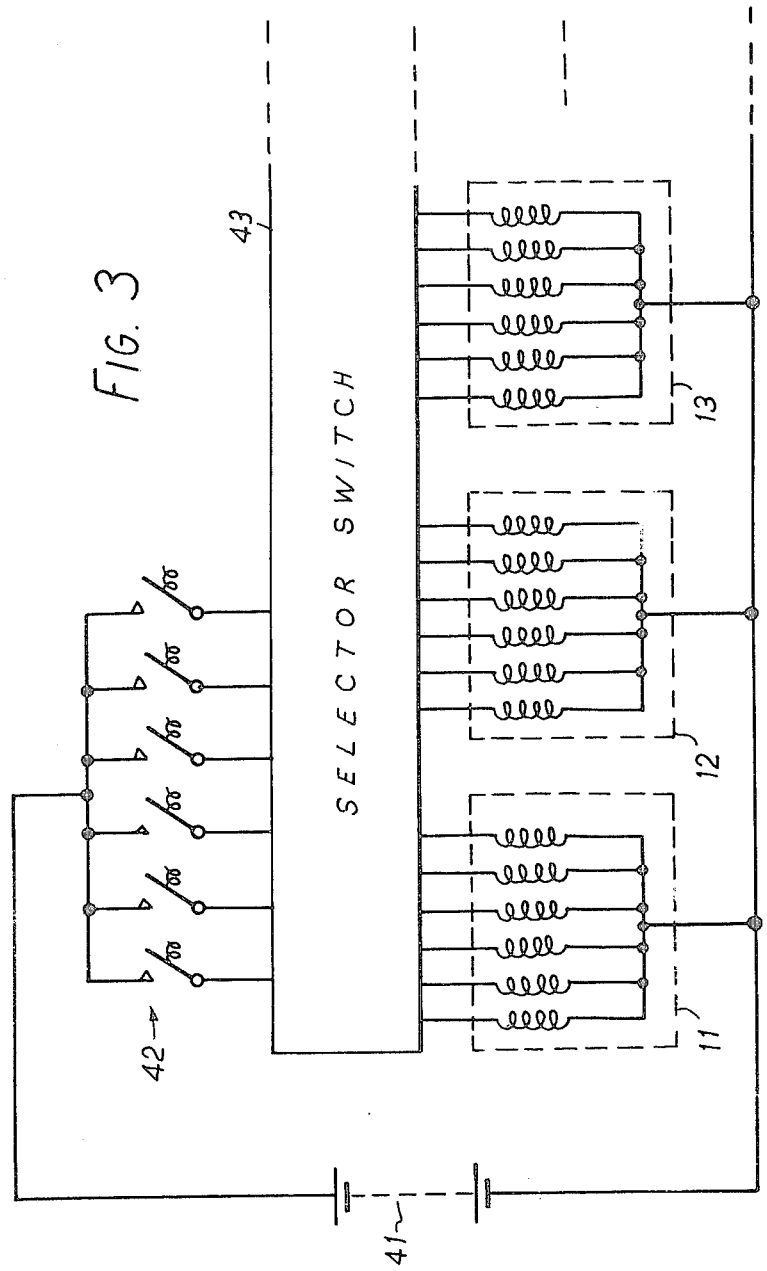

United States Patent [19]

Hannen et al.

[11] 4,191,945

[45] Mar. 4, 1980

[54] TACTILE INDICATING DEVICE

[76] Inventors: Martin R. Hannen; David V. Charlesworth, both of Melbourne House, Melbourne Rd., Wallington, Surrey, England

[21] Appl. No.: 869,506

[22] Filed: Jan. 16, 1978

[51] Int. Cl.² ............................................. G08B 21/00
[52] U.S. Cl. .................................... 340/407; 35/35 A
[58] Field of Search ........................ 340/407; 35/35 A

[56] References Cited
U.S. PATENT DOCUMENTS 3,987,438  10/1976  Mueller ............................... 340/407

Primary Examiner—Harold I. Pitts
Attorney, Agent, or Firm—Dike, Bronstein, Roberts, Cushman & Pfund

[57] ABSTRACT

Electromechanical apparatus for setting up and erasing alpha-numeric characters or other symbols in braille by means of a tactile display. Dot pins simulating braille are supported for movement within holes in a display plate to a position protruding therefrom to form tactile characters and for retraction to a withdrawn position flush with the surface of the display plate. Solenoid-operated plungers are arranged to selectively project the dot pins. Latch elements are movable by energization of the solenoid to a position to support the plungers in their operative position, a common support for the latch elements movable in a plane perpendicular to the axis of the support plungers to remove the latch elements and spring means for restoring the support plate to its initial position.

6 Claims, 3 Drawing Figures

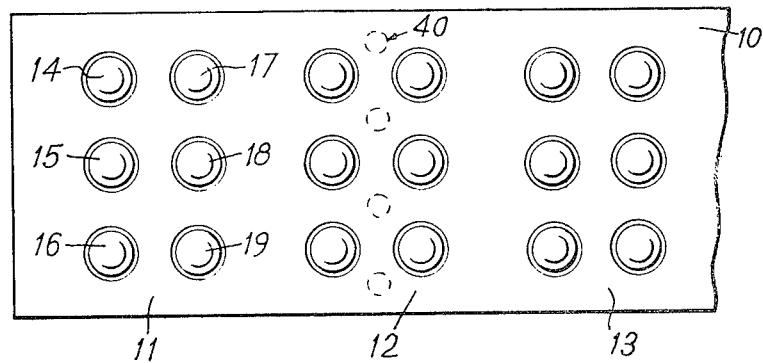

TACTILE INDICATING DEVICE

The present invention relates to tactile display devices and is concerned with electro-mechanical devices whereby braille characters can be displayed and erased.

Braille was devised to enable the blind to read alphanumeric characters and is in the form of a code, usually a six-unit code, for each cell representing a character or symbol. Thus with a six-unit code in each cell there is a matrix of two columns with three in a column. By employing a six-unit code 64 characters can be catered for which include the 26 letters of the alphabet, the numbers 0 and 1 to 9 and various symbols such as full stops, commas, etc. For special purposes a braille code of four units and sometimes of seven units is employed.

Hitherto braille has been provided in what is known as hard copy, i.e. on stiff paper, by embossing the paper to raise different patterns of dots in different cells representing different characters or symbols.

Of recent times it has been proposed to extend the application of braille for enlarging job-opportunities for the blind by providing electromechanical apparatus whereby alpha-numeric characters and associated symbols can be set up for reading and erased as required.

BACKGROUND OF INVENTION

Such an apparatus is shown, for example, in U.S. Pat. No. 3,987,438. In the aforesaid patent, there is an array of plungers which are raised by energizing surrounding solenoids to project their upper ends from a display surface in imitation of braille and each plunger when raised is locked in its operative position by a ball which is moved under the plunger to prevent it from returning to its inoperative position. Each solenoid for lifting its associated plunger has an unlatching solenoid individual thereto, together with a plunger and spring. To unlatch a plunger, its associated unlatching solenoid has to be energized. This draws its plunger downwardly against the spring and the latching ball is drawn by the magnetic field into the unlocking position. Thus, for a row of 48 braille cells, 288 unlatching solenoids together with 280 plungers and 288 plunger springs are required for the unlatching process. In contrast with this, the present invention requires only a single unlatching plate for unlatching all of the 48 cells simultaneously. Thus, the structure and mode of operation for unlatching according to the present invention are very different and lead to an immense simplification over the prior art such as disclosed in the aforesaid patent.

SUMMARY OF INVENTION

As herein illustrated, the apparatus comprises dot pins simulating braille supported for movement within holes in a display plate to a position protruding therefrom to form characters simulative of braille and to be withdrawn to a position flush with the surface of the display plate, solenoid-operated plungers arranged to project the dot pins, latch means arranged to be moved into position by energization of the solenoids to support the plungers in operative position, a common support for removing the latch means from operative position to allow the plungers to return to their inoperative position and means for restoring the plungers to their inoperative position to erase the characters. More specifically, there is an array of spaced, parallel, ferromagnetic plungers, a supporting plate, means supporting the plungers with their lower ends adjacent the support plate for axial movement perpendicular to the supporting plate, a solenoid winding disposed about each plunger within which the plunger is axially movable by energization of the solenoid winding, means for selectively energizing the solenoid windings for moving the plungers into operative position such that their upper ends define any desired character and their lower ends are spaced from the supporting plate, rolling members on the support plate movable thereon into positions beneath the lower ends of the plungers when the latter are moved into operative position said rolling members being comprised of ferromagnetic material so as to be drawn into said position beneath the lower ends of the plungers when the solenoids are energized to move the plungers into their operative positions and means supporting the supporting plate for movement in a plane at right angles to the axes of the plungers for removing the rolling members from beneath the lower ends of the plungers to erase the characters. There are spring means which urge the plungers against the rolling members when the rolling members are moved beneath the lower end of the plungers operative to restore the plungers to their inoperative position when the rolling members are removed from the lower ends of the plungers. The display plate contains holes corresponding in number to the plungers and the dot pins are supported within the holes at the upper ends of the plungers from movement by the plungers to project the ends through the holes when the plungers are in their operative position and to be retracted by the spring means when the latch means are removed from the lower ends of the plungers so that their upper ends are flush with the surface. The upper ends of the dot pins are of a configuration to simulate brialle dots. A high permeability foil is wrapped around each solenoid to reduce substantially the amount of magnetic flux from one winding to another. Optionally high permeability metal bars may be arranged between them substantially parallel to the solenoid winding to effect such reduction of magnetic flux from one winding to the other.

The invention will now be described, by way of example, with reference to the accompanying drawings, in which FIG. 1 shows in plan part of a braille display plate and FIG. 2 shows in cross-section part of one embodiment of the invention for use with the display plate of FIG. 1, and FIG. 3 is a diagram of an elementary circuit for controlling the energisation of solenoids in a row of devices according to FIG. 2.

Referring to FIG. 1, this shows part of a braille display-plate 10 which contains a row of 48 braille cells of which three are shown at 11, 12 and 13 each cell containing a matrix of six dot-positions 14 to 19 in two columns of three each as shown. Beneath the display plate 10 there is provided for each cell, electro-mechanical apparatus whereby different patterns of braille dots can be raised through the display plate to be read and whereby they can be retracted for erasure.

The electro-mechanical apparatus for each cell comprises an array of six solenoid windings of which two are shown schematically at 20 and 21 in FIG. 2 for the cell 11 of FIG. 1 and associated with the dot positions 16 and 19. The solenoids are arranged parallel to and closely adjacent one another. Each winding has a ferromagnetic plunger therein such as the plungers 22 and 23, each plunger having an inoperative position in which the plunger 22 is shown and, upon energisation of its associated winding, an operative position in which the plunger 23 is shown.

For each plunger there are provided independent latching means whereby the plunger can be latched in its operative position. In addition unlatching means are provided common to all plungers.

In FIG. 2 each independent latching means comprises a rolling member in the form of a steel ball such as the balls 24 and 25. Normally each latching ball sits in a pocket such as the pockets 26 and 27 the ball 24 being shown in this position. When a winding such as the winding 21 is energised the plunger 23 moves upwardly into its operative position shown whereby a gap 28 is created between the lower end of the plunger 23 and an unlatching plate 29 on which the lower end of the plunger sits i.e. when the plunger is in its inoperative position as shown for the plunger 22. As the gap 28 is created, magnetic flux from the plunger 23 attracts the ball 25 into the gap 28 whereby the plunger is latched in its operative position to be held there when the energising current in the winding 21 is removed.

The unlatching plate 29 is common to all the plungers and to unlatch all plungers which are in their operative positions and permit them to return to their inoperative positions the unlatching plate 29 is made laterally slidable as indicated by the arrow 44. When the plate 29 is so moved all balls, such as the ball 25, which are in latching positions are rolled to one side back into their pockets such as 24 whereby their associated plungers are unlatched and can return to their inoperative positions as shown for the plunger 22.

Referring now to the structure of FIG. 2 in more detail, the windings shown schematically at 20 and 21 are on formers 30 and 31 which extend between two frame members 32 and 33 of non-magnetic material. The member 33 includes the pockets such as 26 and 27 in which the latching balls are normally located. Apertures such as 34 and 35 are provided in the member 32 through which the plungers extend and contact the lower ends of dot-pins such as 36 and 37 which project into apertures such as those indicated at 16 and 19 in the braille display-plate 10. The dot-pins are spring loaded by springs such as those shown at 38 and 39 whereby they are normally retracted downwardly as shown for the dot-pin 36 and urge their associated plungers such as 22 into their inoperative positions. Each dot-pin has a domed upper end as shown whereby when a dot-pin is urged upwardly by energisation of its associated winding the domed upper end in projecting above the display-plate 10 as shown for the dot-pin 37 simulates a braille dot.

It will be appreciated that when a ball is in its latching position, as shown for the ball 25, and the energising current is removed from its associated winding, the effect of the spring, such as 39, is to urge the plunger into firm contact with the latching ball which makes the latch secure and ensures the rolling action of the ball when the unlatching plate is slid to its unlatching position. Furthermore, to ensure that a ball, such as 25, when in its latching position is centralised with the end of its associated plunger the stroke of the plunger 23 is made long enough to ensure that the ball, held on the end of the plunger by magnetic attraction, enters the mouth of the former 30. When the energising current is removed the magnetic retentivity of the steel ball ensures that the ball remains in its central position as shown for the ball 25 when the plunger is urged back by the return spring 39 to its final operative and latched position.

The unlatching plate is preferably so spring-loaded as to be normally urged to the right in FIG. 2 into a normal or rest position ready for its unlatching function. It can be arranged to slide the unlatching plate manually when erasure is required or alternatively or in addition it can be actuated by a solenoid (not shown).

In one example of the embodiment shown in FIGS. 1 and 2, the pitch of the dot-locations 14 to 19 is 0.1" and the cell pitch is 0.25". The plungers are 0.041" in diameter and 0.66" long and of cold-drawn, soft iron. The latching balls are of 0.8 mm diameter and of non-corrodable steel. The formers for the windings are of extruded brass tube of 0.056" diameter and 0.807" long. The wall thickness of the brass tube is 0.010" which ensures a rigid assembly and good magnetic coupling between the windings and their associated plungers. With such an arrangement a pulse of energising current of about 10 m.s. has been found sufficient for reliable operation. Thus to set up a braille character in any one cell, the windings for that cell are selected and windings appropriate to the character to be set up in braille are then selected and energised.

When using an arrangement as shown in FIGS. 1 and 2 it has been found that a compact array of windings and plungers can lead to erratic operation by the effect of stray magnetic field from one winding linking with the plungers of adjacent windings. Two different ways of preventing such erratic operation have been successfully applied. In one of these a single-turn wrapping of high-permeability foil such as mu-metal is provided around each winding. The foil can be of about 0.005" in thickness whereby the cross-sectional area of the mu-metal is about the same as the cross-sectional area of the plunger. In the other method each cell has four bars of high-permeability, soft iron located between the windings as shown in dotted lines in FIG. 1 at 40 and extending between the members 32 and 33.

It will be appreciated that the invention enables an electromechanical tactile braille display to be provided in a form sufficiently compact as to conform with the standard size of a braille cell.

The manner in which the solenoids of each cell are energised to provide braille display will depend upon the application concerned.

Referring now to FIG. 3 this is a diagram of an elementary circuit for controlling the solenoids in a row of the devices shown in FIG. 2. Normally there will be 48 in a row but for convenience in the drawing only three are shown at 11, 12 and 13 corresponding to 11, 12 and 13 in FIG. 1.

In FIG. 3 the positive pole of a battery 41 is connected through six spring loaded push-button switches into a selector switch 43. Initially the selector switch 43 is so set as to connect the switches 42 to the six solenoid windings shown of the device 11. Thus a pattern of the windings in the device 11 can be energised from the battery 41 by transient depression of a corresponding pattern of the push-buttons 42 whereby a corresponding tactile display is set up and latched. The selector switch 43 is then operated to disconnect the push-button switches from the windings of the device 11 and to connect them to the windings of the device 12. The push-buttons 42 are again transiently depressed in a required pattern to set up a corresponding tactile display with the device 12. This process is repeated for all 48 devices.

When all 48 devices have been set-up and read operation of a common unlatching member (not shown) erases the displays on all 48 devices simultaneously.

Although mechanical, manually-operated push-button and selector switches can be used as described, electronic switches will normally be employed.

We claim:

1. Electromechanical apparatus for setting up and erasing alpha-numeric characters and other symbols in braille comprising an array of spaced, parallel ferromagnetic plungers, a supporting plate, means supporting the plungers with their lower ends adjacent the supporting plate for axial movement perpendicular to the plane of the supporting plate, a solenoid winding disposed about each plunger within which the plunger is axially movable by energization of the solenoid winding, means for selectively energizing the solenoid winding for moving the plunger into operative position such that their upper ends define any desired characters and their lower ends are spaced from the supporting plate, rolling members on the supporting plate movable thereon into position beneath the lower ends of the plungers when the latter are moved into operative position, said rolling members being comprised of ferromagnetic metal so as to be drawn into said operative position beneath the lower ends of the plungers when the latter are raised from the supporting plate and means supporting the supporting plate for movement in a plane at right angles to the axis of the plunger for removing the rolling members from beneath the lower ends of the plungers to erase the characters.

2. Apparatus according to claim 1 wherein there are spring means which urge the plungers against the rolling members when the rolling members are moved into positions beneath the lower ends of the plungers, said spring means being operable to restore the plungers to their inoperative position when the rolling members are removed from the lower ends thereof.

3. Apparatus according to claim 1 wherein there is means for effecting movement of the support plate in a plane at right angles to the plungers to remove the rolling members from the lower ends of the plungers and spring means for restoring the support plate to its initial position.

4. Apparatus according to claim 1 comprising a display plate containing holes corresponding in number to the plungers and dot pins supported within the holes at the upper ends of the plungers for movement of the plungers to project their ends through the holes in the plate when the plungers are in their operative position and to be restored by the springs when the plungers are in their operative positions to positions in which the ends are flush with the plate and wherein the upper ends of the dot pins are of a configuration simulating braille dots.

5. Apparatus according to claim 1 wherein a high permeability foil is wrapped around each solenoid winding to reduce substantially the amount of magnetic flux from one winding interfering with the plunger of another winding.

6. Apparatus according to claim 1 comprising high permeability metal bars arranged between and substantially parallel to the solenoid windings to reduce substantially the amount of magnetic flux from one winding interfering with the plunger of another winding.

* * * * *

UNITED STATES PATENT AND TRADEMARK OFFICE
CERTIFICATE OF CORRECTION

PATENT NO. : 4,191,945
DATED : March 4, 1980
INVENTOR(S) : Martin R. Hannen; David V. Charlesworth It is certified that error appears in the above-identified patent and that said Letters Patent are hereby corrected as shown below:

Following the identification of the inventors, add

Assignee:  Clarke & Smith Industries Limited
           Surrey, England

Signed and Sealed this

First Day of July 1980

[SEAL]

Attest:

SIDNEY A. DIAMOND

Attesting Officer

Commissioner of Patents and Trademarks